United States Patent
Itagaki et al.

(10) Patent No.: US 10,308,241 B2
(45) Date of Patent: Jun. 4, 2019

(54) DRIVE CONTROL SYSTEM FOR VEHICLE

(71) Applicant: TOYOTA JIDOSHA KABUSHIKI KAISHA, Toyota-shi (JP)

(72) Inventors: Kenji Itagaki, Suntou-gun (JP);
Naofumi Magarida, Suntou-gun (JP);
Koichi Kato, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 62 days.

(21) Appl. No.: 15/639,751

(22) Filed: Jun. 30, 2017

(65) Prior Publication Data

US 2018/0015917 A1 Jan. 18, 2018

(30) Foreign Application Priority Data

Jul. 15, 2016 (JP) .................................. 2016-140908

(51) Int. Cl.
*B60W 20/50* (2016.01)
*B60K 6/365* (2007.10)
(Continued)

(52) U.S. Cl.
CPC ............. *B60W 20/50* (2013.01); *B60K 6/365* (2013.01); *B60K 6/383* (2013.01); *B60W 10/02* (2013.01); *B60W 10/06* (2013.01); *B60W 10/08* (2013.01); *F02B 63/04* (2013.01); *B60K 6/26* (2013.01); *B60K 6/46* (2013.01); *B60W 2510/0225* (2013.01); *B60W 2710/022* (2013.01); *B60W 2710/083* (2013.01); *Y02T 10/7258* (2013.01); *Y10S 903/906* (2013.01); *Y10S 903/911* (2013.01); *Y10S 903/913* (2013.01); *Y10S 903/93* (2013.01)

(58) Field of Classification Search
None
See application file for complete search history.

(56) References Cited

U.S. PATENT DOCUMENTS 6,424,903 B1 * 7/2002 Amisano ............... B60W 30/18
477/175
6,517,464 B2 * 2/2003 Yamazaki ............... B60K 6/36
477/5

(Continued)

FOREIGN PATENT DOCUMENTS

JP 2015-202788 11/2015
WO WO 2013/040135 A1 3/2013

*Primary Examiner* — Dirk Wright
(74) *Attorney, Agent, or Firm* — Oblon, McClelland, Maier & Neustadt, L.L.P.

(57) ABSTRACT

In a drive control system for a vehicle configured to cause the vehicle to travel in a limp-home mode when a malfunction occurs in a selectable one-way clutch, when it is determined that a malfunction occurs in the SOWC, the cause of the malfunction is specified as one of a plate-open failure of a selector plate that is unintentionally placed in an open state, and a sensor failure. In the case of the plate-open failure, a first limp-home traveling mode is carried out in which the vehicle travels in the limp-home mode while keeping the SOWC in a negative rotational speed range. In the case of the sensor failure, a second limp-home traveling mode is carried out in which the vehicle travels in the limp-home mode while the SOWC is placed in the non-engaged state.

6 Claims, 11 Drawing Sheets

(51) Int. Cl.
*B60K 6/383* (2007.10)
*B60W 10/02* (2006.01)
*B60W 10/06* (2006.01)
*B60W 10/08* (2006.01)
*F02B 63/04* (2006.01)
*B60K 6/26* (2007.10)
*B60K 6/46* (2007.10)

(56) References Cited

U.S. PATENT DOCUMENTS 6,722,456 B2 * 4/2004 Hisada .................. B60K 6/445
                                                                        180/65.235
6,849,027 B2 * 2/2005 Eich ...................... B60W 10/02
                                                                        477/174
9,576,405 B2 * 2/2017 Amano .................. B60K 6/387
9,771,067 B2 * 9/2017 Hokoi .................... B60K 6/28

* cited by examiner

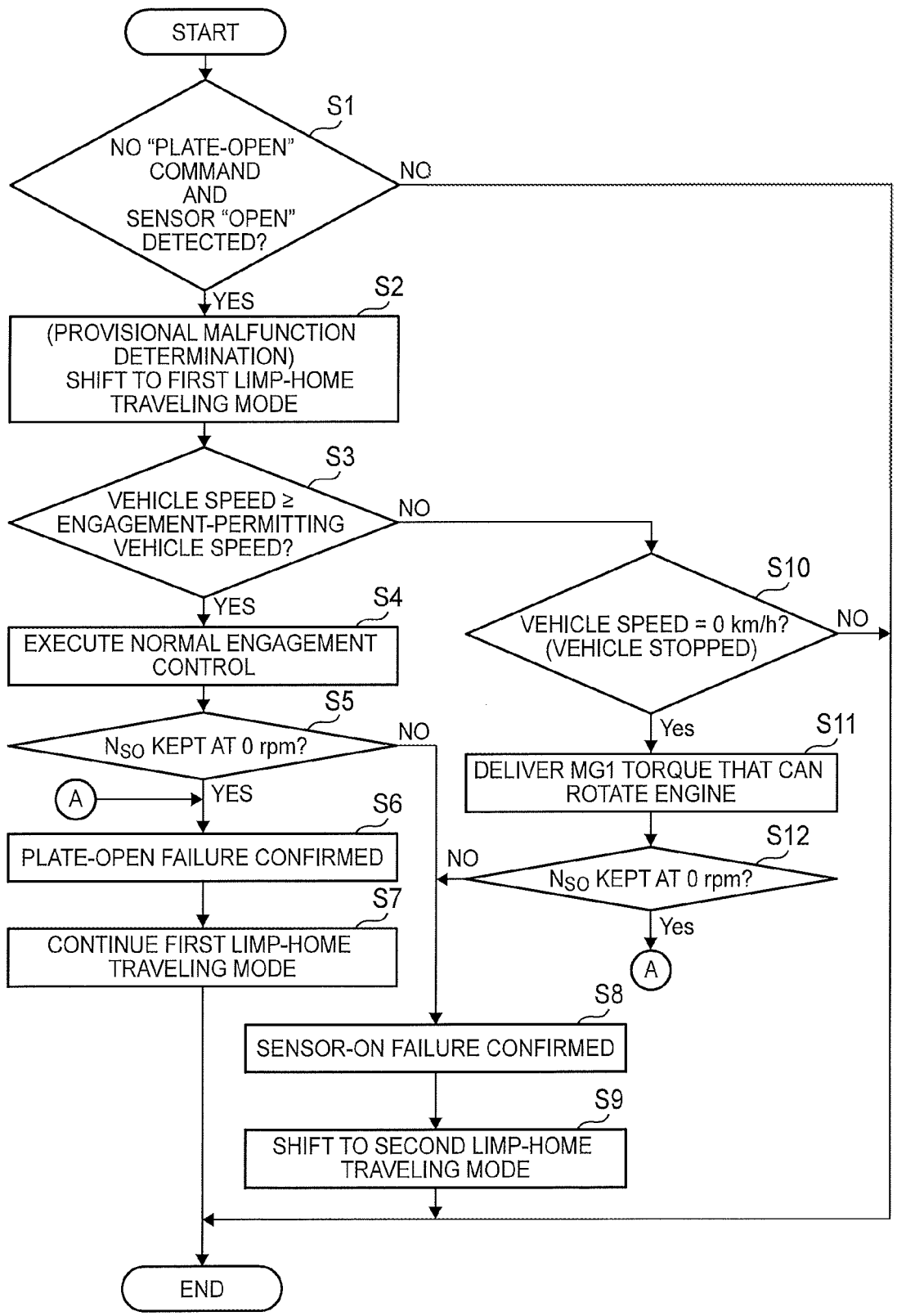

DRIVE CONTROL SYSTEM FOR VEHICLE

CROSS-REFERENCE TO RELATED APPLICATIONS

This application claims priority to Japanese Patent Application No. 2016-140908 filed on Jul. 15, 2016, which is incorporated herein by reference in its entirety.

BACKGROUND

1. Technical Field

The disclosure relates to a drive control system for a vehicle.

2. Description of Related Art

A selectable one-way clutch (SOWC) is known as one type of one-way clutch. The SOWC can be selectively switched between an engaged state in which a selector plate as a switching member is placed in an open state, so that the rotational direction of a rotating member is restricted to one direction, and a non-engaged state in which the selector plate is placed in a closed state, so that the rotating member can rotate in both directions.

In a drive control system for a hybrid vehicle including the SOWC, as described in Japanese Patent Application Publication No. 2015-202788 (JP 2015-202788 A), when a malfunction occurs, more specifically, when a selector plate of the SOWC is unintentionally kept in the open state, the system shifts from normal traveling to limp-home traveling, and the vehicle travels while rotating the SOWC in a negative rotational speed range.

SUMMARY

However, in the system described in JP 2015-202788 A, since the electric motor rotates in a negative direction so as to keep the SOWC in the negative rotational speed range, and the motor also delivers torque in a negative direction, during limp-home traveling, the electric motor keeps consuming electric power. Therefore, the state of charge of a battery is likely to be reduced, and the distance over which the vehicle can travel in the limp-home mode is limited.

This disclosure has been developed in view of the above situation, and provides a drive control system for a vehicle, which can extend the distance over which the vehicle can travel in a limp-home mode when a malfunction occurs in a selectable one-way clutch.

According to one aspect of the disclosure, a drive control system for a vehicle including an engine, an electric motor, a selectable one-way clutch, a planetary gear mechanism, an actuator, a sensor, and an electronic control unit is provided. The selectable one-way clutch includes an annular fixed plate on which engaging pieces are mounted, an annular rotating plate engaged with the engaging pieces, and an annular selector plate provided between the fixed plate and the rotating plate. The selectable one-way clutch is configured to selectively switch between an engaged state and a non-engaged state. The engaged state is a state in which the selector plate is in an open state such that the engaging pieces engage with the rotating plate to restrict a rotational direction of the rotating plate to one direction. The non-engaged state is a state in which the selector plate is in a closed state such that the engaging pieces cannot engage with the rotating plate, and the non-engaged state being a state in which the rotating plate can rotate in both directions. The planetary gear mechanism includes an input element coupled to the engine, an output element that transmits power toward drive wheels, and a reaction-force element, as at least three rotating elements. The reaction-force element is configured to rotate integrally with the rotating plate and to be selectively non-rotatably fixed by the selectable one-way clutch. The planetary gear mechanism is configured to distribute power generated from the engine to the electric motor side and the drive wheel side, when the selectable one-way clutch is in the non-engaged state. The actuator includes a movable member coupled to the selector plate. The actuator is configured to switch the selector plate between the open state and the closed state. The sensor is configured to detect a position of the movable member, and output a signal corresponding to the position. The electronic control unit is configured to (i) determine whether a malfunction occurs due to a first failure or a second failure, where the malfunction is detection of the open state of the selector plate while the vehicle is traveling with the selectable one-way clutch controlled to be in the non-engaged state. The first failure is a condition where the selector plate is actually placed in the open state, and the second failure is a condition where the sensor outputs the signal indicating the open state of the selector plate, even though the selector plate is actually in the closed state. The electronic control unit is also configured to (ii) execute a first limp-home traveling mode in which the vehicle travels while causing the electric motor to keep a rotational direction of the reaction-force element equal to the above-indicated one direction, when the malfunction is caused by the first failure, and (iii) execute a second limp-home traveling mode in which the drive wheels are driven by the engine while the selectable one-way clutch is kept in the non-engaged state, and the electric motor generates electric power, using power distributed to the electric motor side by the planetary gear mechanism, when the malfunction is caused by the second failure.

According to the drive control system for the vehicle as described above, when a malfunction of the selector one-way clutch is detected, the cause of the malfunction is specified as either the first failure or the second failure. The first limp-home traveling mode is carried out when the cause of the malfunction is the first failure, and the second limp-home traveling mode is carried out when the cause of the malfunction is the second failure. In the second limp-home traveling mode, electric power can be generated by the electric motor. Thus, consumption of electric power can be reduced, and the distance over which the vehicle can travel in the limp-home mode can be extended.

In the drive control system as described above, the electronic control unit may be configured to (i) control the vehicle to a first state in which no torque is delivered from the electric motor, (ii) determine that the malfunction is caused by the first failure, when a rotational speed of the reaction-force element is kept at zero in the first state, and (iii) determine that the malfunction is caused by the second failure, when the rotational speed of the reaction-force element is not kept at zero in the first state.

In the drive control system as described above, the cause of the malfunction is specified as either the first failure or the second failure, by checking if the selectable one-way clutch actually rotates while the vehicle is traveling. In this manner, the cause of the malfunction can be correctly specified. Also, since the specifying control is performed during traveling, the second limp-home traveling mode can be carried out at an early opportunity. Therefore, the distance over which the vehicle can travel in the limp-home mode can be extended.

In the drive control system as described above, the electronic control unit may be configured to: (i) control the vehicle to a second state in which torque that enables the engine to be rotated after the vehicle is stopped is delivered from the electric motor, (ii) determine that the malfunction is caused by the first failure, when a rotational speed of the reaction-force element is kept at zero in the second state, and (iii) determine that the malfunction is caused by the second failure, when the rotational speed of the reaction-force element is not kept at zero in the second state.

In the drive control system as described above, the cause of the malfunction is specified as either the first failure or the second failure, by checking if the selectable one-way clutch actually rotates after the vehicle is stopped. In this manner, the second limp-home traveling mode can be carried out after the vehicle is started for the first time after detection of the malfunction, and the distance over which the vehicle can travel in the limp-home mode can be extended.

In the drive control system as described above, the electronic control unit may be configured to: (i) initially execute the first limp-home traveling mode when the malfunction occurs, and (ii) then continue the first limp-home traveling mode when the electronic control unit determines that the malfunction is caused by the first failure, and shift from the first limp-home traveling mode to the second limp-home traveling mode when the electronic control unit determines that the malfunction is caused by the second failure.

In the drive control system as described above, when a malfunction of the selectable one-way clutch occurs, the vehicle is initially placed in a state in which it can travel for sure, as a fail-safe, and then, can be switched to a controllable traveling mode during limp-home traveling. It is thus possible to extend the distance over which the vehicle can travel in the limp-home mode, while curbing deterioration of the driveability.

In the drive control system as described above, the planetary gear mechanism includes a first planetary gear mechanism and a second planetary gear mechanism. The first planetary gear mechanism may include a first sun gear coupled to the electric motor, a first carrier coupled to the engine, and a first ring gear coupled to an output member that transmits power toward the drive wheels. The second planetary gear mechanism may include a second sun gear that rotates integrally with the first sun gear, a second carrier that rotates integrally with the first carrier, and a second ring gear. The input element may be the first carrier, and the output element may be the first ring gear, while the reaction-force element may be the second ring gear.

In the drive control system as described above, the disclosure can be applied to the vehicle in which the selectable one-way clutch functions as a so-called HIGH-gear lock mechanism.

In the drive control system as described above, the planetary gear mechanism may include a sun gear coupled to the electric motor, a carrier coupled to the engine, and a ring gear coupled to an output member that transmits power toward the drive wheels. The input element may be the carrier, and the output element may be the ring gear, while the reaction-force element may be the sun gear.

In the drive control system as described above, the disclosure can be applied to the vehicle in which the selectable one-way clutch functions as a mechanism that locks a rotary shaft of the electric motor.

According to the drive control system of the disclosure, when a malfunction of the selectable one-way clutch is detected, the cause of the malfunction is specified as either a failure of the selector plate that is actually placed in the open state, or a sensor failure, so that the vehicle can travel in one of controllable states selected depending on the cause of the malfunction. Since the controllable states include a state in which the electric motor functions as a generator, consumption of electric power can be reduced. Accordingly, the vehicle including the drive control system of the disclosure can extend or increase the distance over which the vehicle can travel in the limp-home mode, to be longer than before.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 is a flowchart illustrating a method of specifying a cause of a malfunction by the drive control system for the vehicle;

DETAILED DESCRIPTION OF EMBODIMENTS

A drive control system for a vehicle according to one embodiment of the disclosure will be specifically described with reference to the drawings. The drive control system is an electronic control unit.

Figure 1:
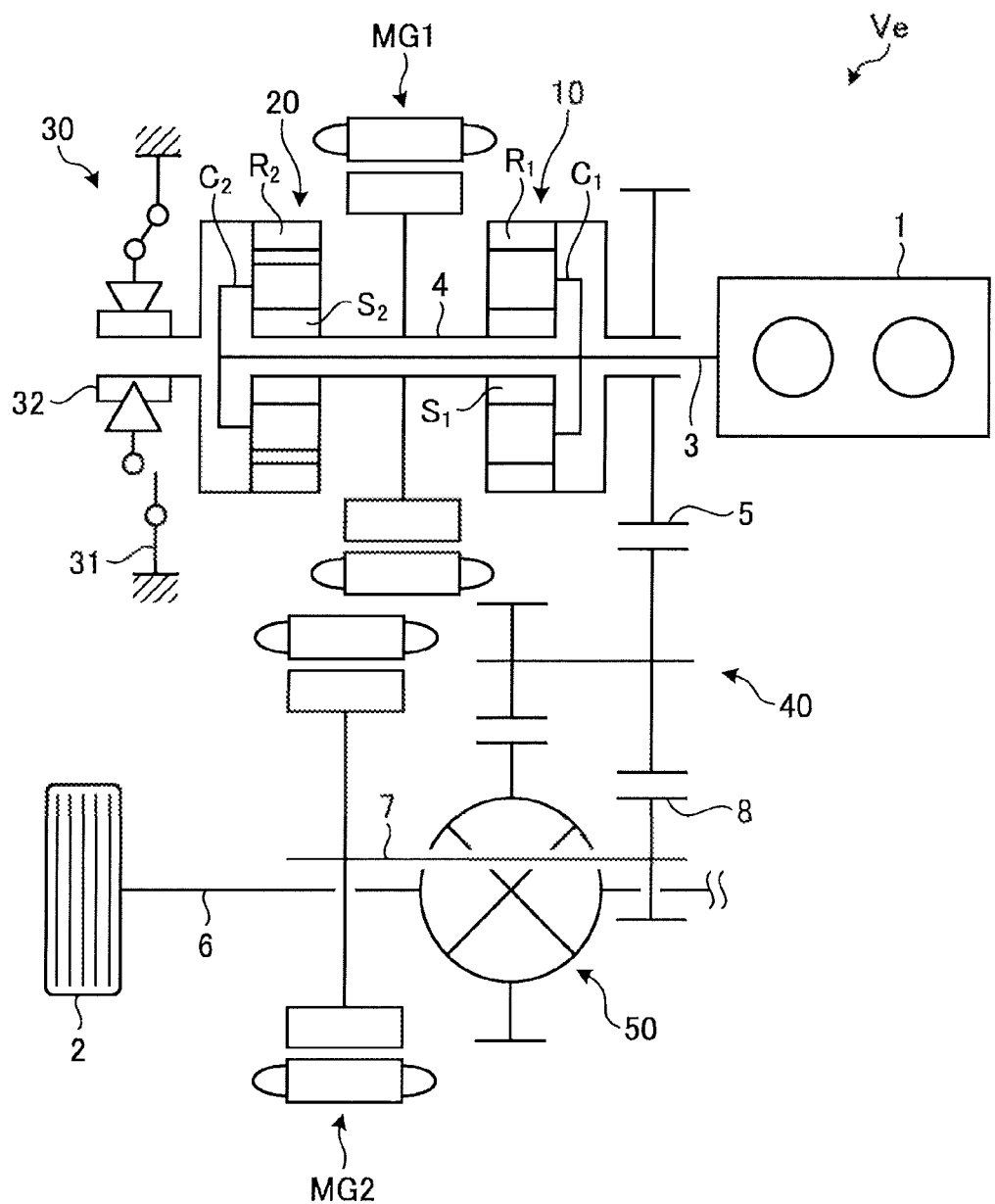
FIG. 1 is a skeleton diagram showing a vehicle according to one embodiment of the disclosure.

FIG. 1 is a skeleton diagram showing a vehicle according to the embodiment. The vehicle Ve includes an engine 1, a first motor MG1, and a second motor MG2, as power sources. The engine 1 is provided by an internal combustion engine. Each of the motors MG1, MG2 is a known motor-generator (electric motor) having a function as a motor and a power generating function, and is electrically connected to a battery (not shown) via an inverter (not shown).

The vehicle Ve includes a first planetary gear mechanism 10 as a power split device, a second planetary gear mechanism 20 as a speed change unit, a selectable one-way clutch (which will be called "SOWC") 30, a counter gear mechanism 40, and a differential gear mechanism 50. Power generated by the engine 1 is split by the first planetary gear mechanism 10 and distributed to the first motor MG1 side and drive wheels 2 side. The first motor MG1 functions as a generator, using mechanical power distributed to the first motor MG1 side. Electric power generated by the first motor MG1 is charged into the battery, or supplied to the second motor MG2 via an inverter. The second motor MG2 functions as a motor, using the electric power thus supplied. Further, when torque (which will be called "engine torque") generated by the engine 1 is transmitted to the drive wheels 2, the SOWC 30 holds engine reaction force, so that the second planetary gear mechanism 20 functions as a speed increasing machine.

A crankshaft of the engine 1 is coupled to an input shaft 3. The input shaft 3 and the crankshaft are arranged on the same axis, and the first planetary gear mechanism 10, first motor MG1, second planetary gear mechanism 20, and the SOWC 30 are arranged on the same axis as the input shaft 3. The second motor MG2 is disposed on a different axis from that of the crankshaft.

The first planetary gear mechanism 10 is in the form of a single pinion type planetary gear mechanism, and includes three rotating elements, i.e., a first sun gear $S_1$, a first ring gear $R_1$ disposed concentrically with the first sun gear $S_1$, and a first carrier $C_1$ that holds pinions that mesh with the first sun gear $S_1$ and the first ring gear $R_1$ such that the pinions can rotate about themselves and rotate about the axis of the planetary gear mechanism.

The first motor MG1 is coupled to the first sun gear $S_1$, and a first rotor shaft 4 of the first motor MG1 and the first sun gear $S_1$ rotate as a unit. The engine 1 is coupled to the first carrier $C_1$, and the crankshaft of the engine 1, input shaft 3, and the first carrier $C_1$ rotate as a unit. An output gear 5 that transmits torque from the first planetary gear mechanism 10 toward the drive wheels 2 is integrated with the first ring gear $R_1$. The first ring gear $R_1$ is an output element that transmits (outputs) torque toward the drive wheels 2, and the output gear 5 and the first ring gear $R_1$ rotate as a unit. The output gear 5, which is an output member, is not necessarily integrated with the first ring gear $R_1$, but may be coupled to the first ring gear $R_1$ such that the output gear 5 and the first ring gear $R_1$ can rotate as a unit.

The output gear 5 is connected to the differential gear mechanism 50 via the counter gear mechanism 40. The drive wheels 2 are connected to the differential gear mechanism 50 via right and left drive shafts 6.

Torque generated from the second motor MG2 is added to the torque transmitted from the engine 1 to the drive wheels 2. A second rotor shaft 7 of the second motor MG2 rotates integrally with a reduction gear 8, and is disposed in parallel with the input shaft 3. The reduction gear 8, which is mounted on the second rotor shaft 7, meshes with a counter driven gear of the counter gear mechanism 40.

The second planetary gear mechanism 20 is in the form of a double pinion type planetary gear mechanism, and includes three rotating elements, i.e., a second sun gear $S_2$, a second ring gear $R_2$ disposed concentrically with the second sun gear $S_2$, and a second carrier $C_2$ that holds first pinions and second pinions such that the pinions can rotate about themselves and rotate about the axis of the planetary gear mechanism. The first pinions mesh with the second sun gear $S_2$, and the second pinions mesh with the first pinions and the second ring gear $R_2$.

The first motor MG1 is coupled to the second sun gear $S_2$, and the first rotor shaft 4 of the first motor MG1, first sun gear $S_1$, and the second sun gear $S_2$ rotate as a unit. The engine 1 is coupled to the second carrier $C_2$, and the input shaft 3, first carrier $C_1$, and the second carrier $C_2$ rotate as a unit. The SOWC 30 as an engagement mechanism is coupled to the second ring gear $R_2$, and a notch plate 32 of the SOWC 30 and the second ring gear $R_2$ rotate as a unit. The second ring gear $R_2$ is a reaction-force element that is selectively non-rotatably fixed by the SOWC 30.

The SOWC 30 is a HIGH-gear lock mechanism that includes a pocket plate 31 fixed to a case, and is operable to fix the second ring gear $R_2$. The SOWC 30 switches between an engaged state in which it restricts the rotational direction of the second ring gear $R_2$ to only one direction, and a non-engaged state in which the second ring gear $R_2$ can rotate in both directions. The detailed configuration of the SOWC 30 will be described later with reference to FIG. 3.

The first and second planetary gear mechanisms 10, 20 constructed as described above constitute a composite planetary gear mechanism including four rotating elements. The composite planetary gear mechanism includes a first rotating element (first carrier $C_1$, second carrier $C_2$) as an input element coupled to the engine 1, a second rotating element (first ring gear $R_1$) as an output element that transmits power toward the drive wheels 2, a third rotating element (second ring gear $R_2$) as a reaction-force element that is selectively non-rotatably fixed by the SOWC 30, and a fourth rotating element (first sun gear $S_1$, second sun gear $S_2$) coupled to the first motor MG1. Namely, the composite planetary gear mechanism includes at least three rotating elements, i.e., the input element, output element, and the reaction-force element, and distributes power generated by the engine 1 to the first motor MG1 side and the drive wheels 2 side by placing the SOWC 30 in the non-engaged state while the vehicle is traveling with the power of the engine. Then, the composite planetary gear mechanism functions as a speed increasing machine when the SOWC 30 is engaged (placed in a HIGH-gear locked state) during traveling with power of the engine.

Figure 2A:
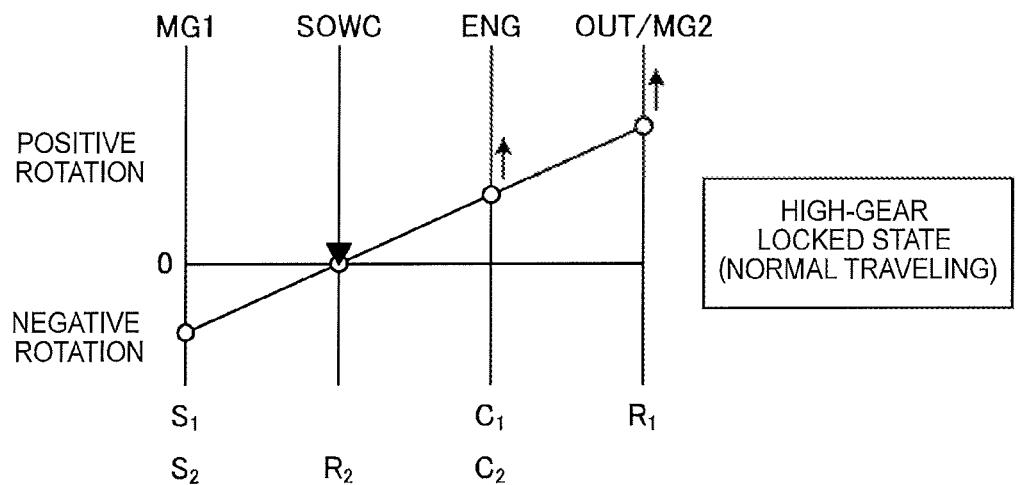
FIG. 2A is a nomographic chart showing a HIGH-gear locked state of the vehicle.

Next, the HIGH-gear locked state and a continuously variable speed change state of the vehicle Ve will be described. FIG. 2A is a nomographic chart showing the HIGH-gear locked state. The nomographic chart of FIG. 2A shows the rotational speed and rotational direction of each rotating element of the composite planetary gear mechanism. In FIG. 2A, "ENG" denotes the engine 1, and "OUT" denotes the output member. Also, the upward arrow along the ENG axis represents engine torque, and the upward arrow along the OUT/MG2 axis represents drive torque. The drive torque means torque generated at the drive wheels 2 when power generated from the power source of the vehicle Ve is transmitted to the drive wheels 2.

As shown in FIG. 2A, when the SOWC 30 is engaged, positive rotation of the second ring gear $R_2$ is inhibited, and negative rotation of the second ring gear $R_2$ is permitted. The positive rotation means rotation in the same direction as the rotational direction of the crankshaft during traveling with power of the engine. The negative rotation means rotation in the reverse direction relative to the positive rotation. The statement that "the engine 1 rotates" in this description means that the crankshaft makes positive rotation, and does not include negative rotation of the crankshaft.

In the HIGH-gear locked state, the vehicle travels with power of the engine in a condition where the second ring gear $R_2$ is locked by the SOWC 30 such that it cannot rotate in the positive direction; therefore, the vehicle is in an overdrive state in which the rotational speed of the first ring gear $R_1$ (the output rotational speed) is higher than the rotational speed of the first carrier $C_1$ and the second carrier $C_2$ (the input rotational speed). In this case, the SOWC 30 functions as a mechanism for receiving reaction force of engine torque, and the first and second planetary gear mechanisms 10, 20 function as a speed increasing machine. In the HIGH-gear locked state shown in FIG. 2A, the first motor MG1 is co-rotated without producing torque (which will be called "MG1 torque"), thereby to rotate in the negative direction.

Figure 2B:
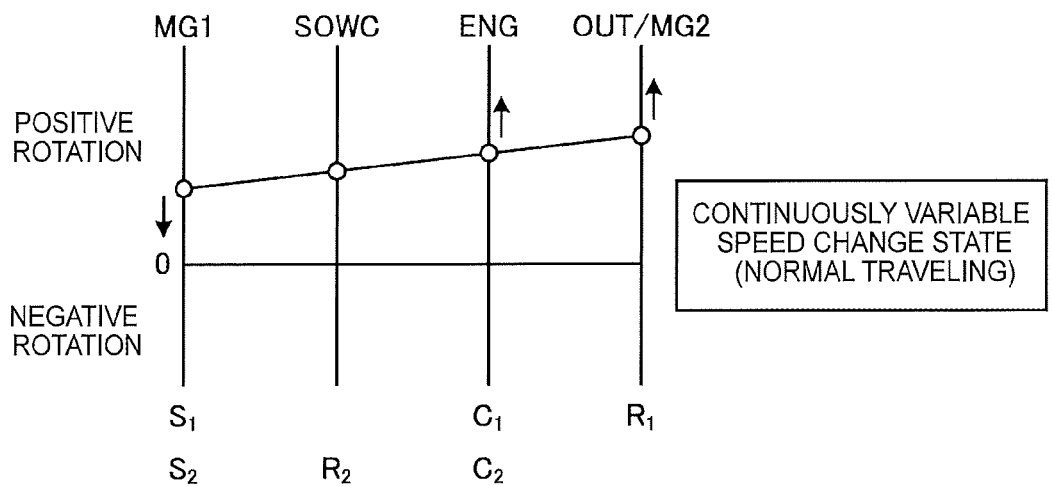
FIG. 2B is a nomographic chart showing a continuously variable speed change state of the vehicle.

By placing the SOWC 30 in a non-engaged state during traveling with power of the engine, the vehicle Ve can be controlled to travel in the continuously variable speed change state. FIG. 2B is a nomographic chart showing the continuously variable speed change state. In FIG. 2B, the downward arrow along the MG1 axis represents MG1 torque, and the upward arrow along the ENG axis represents engine torque, while the upward torque along the OUT/MG2 axis represents drive torque.

As shown in FIG. 2B, when the SOWC 30 is not engaged, positive rotation of the second ring gear $R_2$ is permitted. In the continuously variable speed change state, the vehicle Ve is in an HV traveling mode (engine traveling mode) in which the engine 1 is driven and the vehicle travels with engine torque. In this case, the drive wheels 2 are driven using power generated from the engine 1, and the first motor MG1 rotates in the positive direction, and produces torque in the negative direction so as to hold engine reaction force. Thus, the first motor MG1 is able to generate electric power, using power distributed from the engine 1 to the first motor MG1 side via the first planetary gear mechanism 10. In the continuously variable speed change state, at least the engine 1 is required to function as a power source. Namely, in the continuously variable speed change state, the second motor MG2 may not function as a power source, or the second motor MG2 may function as a power source.

Figure 3:
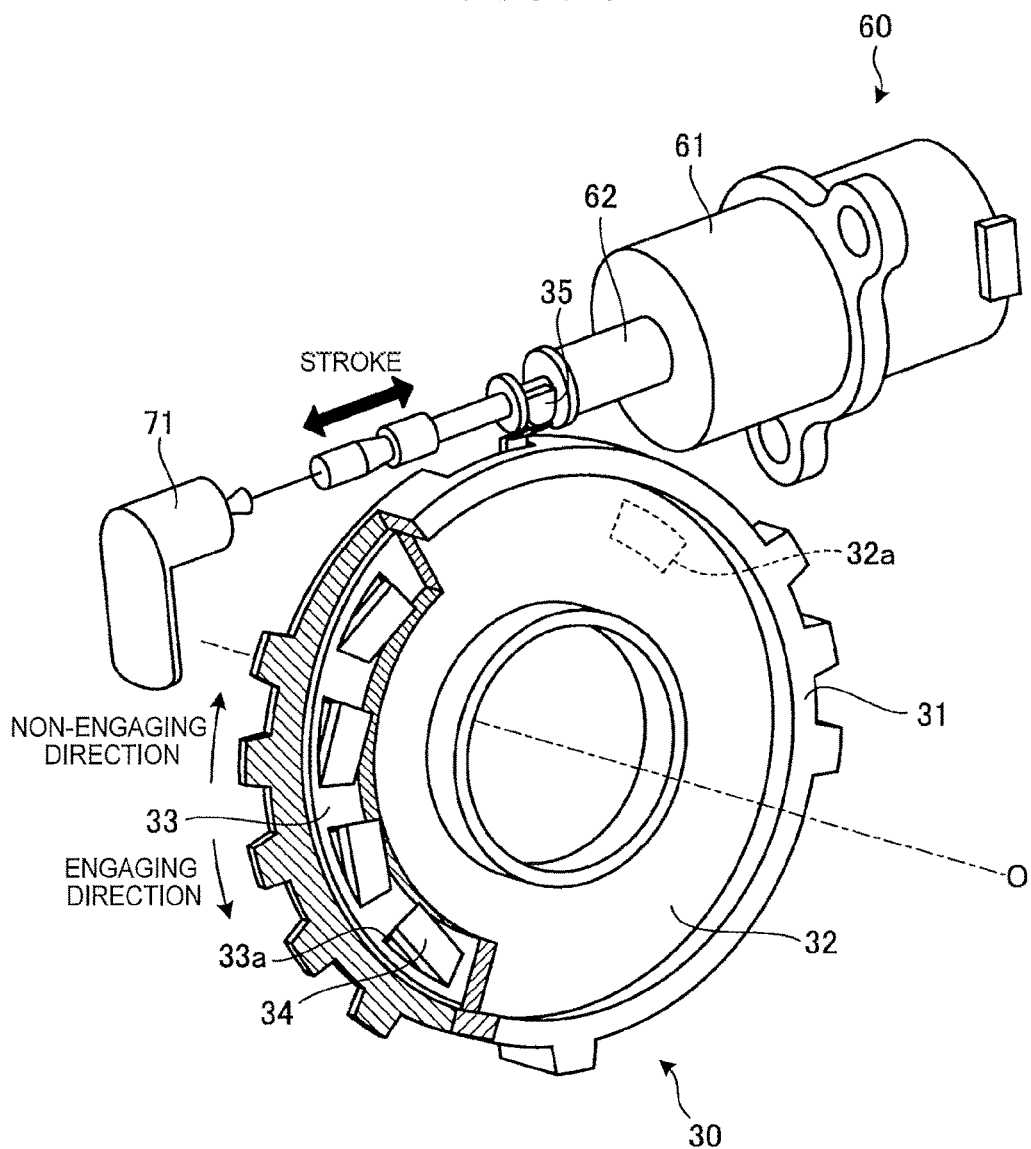
FIG. 3 is a view useful for explaining a selectable one-way clutch of the vehicle of this embodiment.

Next, the SOWC 30 will be described with reference to FIG. 3. In FIG. 3, a part of the pocket plate 31 and a part of the notch plate 32 are illustrated in cross-section. Also in FIG. 3, the center axis O of the SOWC 30 is indicated by a one-dot chain line.

As shown in FIG. 3, the SOWC 30 is an engagement mechanism formed in an annular shape as a whole. The SOWC 30 includes annular pocket plate 31 as a fixed plate, annular notch plate 32 as a rotating plate, selector plate 33 that switches the SOWC 30 between the engaged state and the non-engaged state, struts (engaging pieces) 34, and arm 35. The pocket plate 31, notch plate 32 and selector plate 33, each of which is a disk-like member, are arranged in the axial direction to be opposed to each other. The selector plate 33 is provided between the pocket plate 31 and the notch plate 32. The notch plate 32 and the selector plate 33 are housed in a cylindrical portion of the pocket plate 31, and are configured not to fall off from the pocket plate 31, by means of a snap ring(s) (not shown) fitted in an inner circumferential portion of the cylindrical portion. Also, lubricating oil is supplied to the interior (spaces between adjacent ones of the pocket plate 31, selector plate 33, and the notch plate 32) of the SOWC 30.

The pocket plate 31 is a member that consists of a disk-like plate portion and a cylindrical portion, which are integrally formed, and is configured such that the cylindrical portion extends in the axial direction from an outer peripheral portion of the plate portion. A plurality of pockets (not shown) that receive the struts 34 are provided in a surface of the pocket plate 31 which is opposed to the selector plate 33 and the notch plate 32 in the axial direction. The pockets are provided at positions that are spaced at given intervals in the circumferential direction. Also, elastic members (not shown) that bias the struts 34 toward the notch plate 32 are provided between bottoms of the pockets and the struts 34.

The notch plate 32 is rotatable relative to the pocket plate 31 and the selector plate 33. Notches (engaging recesses) 32a with which the struts 34 engage are provided in a surface of the notch plate 32 which is opposed to the selector plate 33 and the pocket plate 31 in the axial direction. While only one notch 32a is depicted in FIG. 3, a plurality of notches 32a are provided at positions corresponding to the struts 34 (pockets of the pocket plate 31).

The selector plate 33 is rotatable relative to the pocket plate 31 and the notch plate 32, and is also rotatable in an engaging direction and a non-engaging direction. The selector plate 33 is provided with a plurality of windows or through holes 33a at positions corresponding to the pockets of the pocket plate 31. The windows 33a are strut opening and closing windows that extend through the selector plate 33 in the thickness direction, and are provided at positions corresponding to the struts 34.

Further, the selector plate 33 is connected to an actuator 60 via the arm 35, and is able to reciprocate in its circumferential direction between an engaging position and a non-engaging position. The engaging position is a plate position at which the circumferential positions of the windows 33a substantially coincide with those of the struts 34 (i.e., the windows 33a are substantially aligned with the struts 34 in the axial direction). The non-engaging position is a plate position at which the circumferential positions of the windows 33a are different from those of the struts 34 (i.e., the windows 33a are not aligned with the struts 34 in the axial direction). FIG. 3 shows the case (open state) where the selector plate 33 is in the engaging position.

The arm 35 connects the selector plate 33 with the actuator 60, and transmits force generated from the actuator 60, to the selector plate 33. One distal end portion of the arm 35 protrudes outward from the pocket plate 31, and is coupled to the actuator 60. A notch into which the arm 35 is inserted is formed in the cylindrical portion of the pocket plate 31. The notch extends radially through the cylindrical portion of the pocket plate 31, and has a given circumferential length. The other distal end portion of the arm 35 is inserted from the outside of the pocket plate 31 into the notch, to be coupled to the selector plate 33 within the pocket plate 31. Since the movable range of the arm in the circumferential direction is restricted by end portions (walls) of the notch, rotation of the selector plate 33 is stopped when the arm 35 contacts with either of the end portions of the notch.

The actuator 60 is provided by a direct operated electromagnetic actuator. The actuator 60 includes a solenoid (actuator main body) 61 including an electromagnetic coil (not shown) therein, and a shaft-like plunger 62 that protrudes from the solenoid 61. The plunger 62 is a movable member, which moves in a straight line in a condition where one distal end portion is inserted inside the solenoid 61. The arm 35 is coupled to a portion of the plunger 62 which protrudes from the solenoid 61. Thus, a link mechanism that converts linear motion of the plunger 62 into rotary motion of the selector plate 33 is constructed. Also, the actuator 60 is provided with a return spring (not shown) that biases the selector plate 33 in the non-engaging direction via the plunger 62. Further, a stroke sensor 71 is provided for detecting the position (stroke) of the plunger 62. The stroke sensor 71 outputs a position signal corresponding to the detected position of the plunger 62, to an electronic control unit 101 (shown in FIG. 4).

For example, when the actuator 60 is driven so as to move the plunger 62 straight to extend it, upon switching of the SOWC 30 from the non-engaged state to the engaged state, the selector plate 33 rotates in the engaging direction. Then, the selector plate 33 stops at the engaging position after rotating by a given angle. The selector plate 33 placed at the engaging position is in an open state in which the pockets are open so as allow the struts 34 to rise up; therefore, the struts 34 rise up toward the notch plate 32, through the windows 33*a*. Further, when the selector plate 33 is in the open state, the struts 34 may be engaged with the notch plate 32 (engaged state), or the struts 34 may not be engaged with the notch plate 32 (overrun state), depending on the rotational direction of the notch plate 32. In the engaged state, positive rotation of the notch plate 32 is inhibited. In the overrun state, the notch plate 32 rotates in the negative direction. Thus, the SOWC 30 that is in the plate-open state functions in the same manner as a normal one-way clutch.

On the other hand, upon switching from the engaged state to the non-engaged state, the actuator 60 is stopped, and the plunger 62 moves straight to contract, under the bias force of the return spring, so that the selector plate 33 rotates in the non-engaging direction. Then, the selector plate 33 stops at the non-engaging position after rotating by a given angle. The selector plate 33 placed in the non-engaging position is in a closed state in which the pockets are closed such that the struts 34 do not rise up; therefore, the struts 34 are pushed into the pockets by plate portions between the windows 33*a* of the selector plate 33. Since the notch plate 32 and the struts 34 cannot engage with each other when the selector plate 33 is in the closed state, the notch plate 32 can rotate in both directions.

Figure 4:
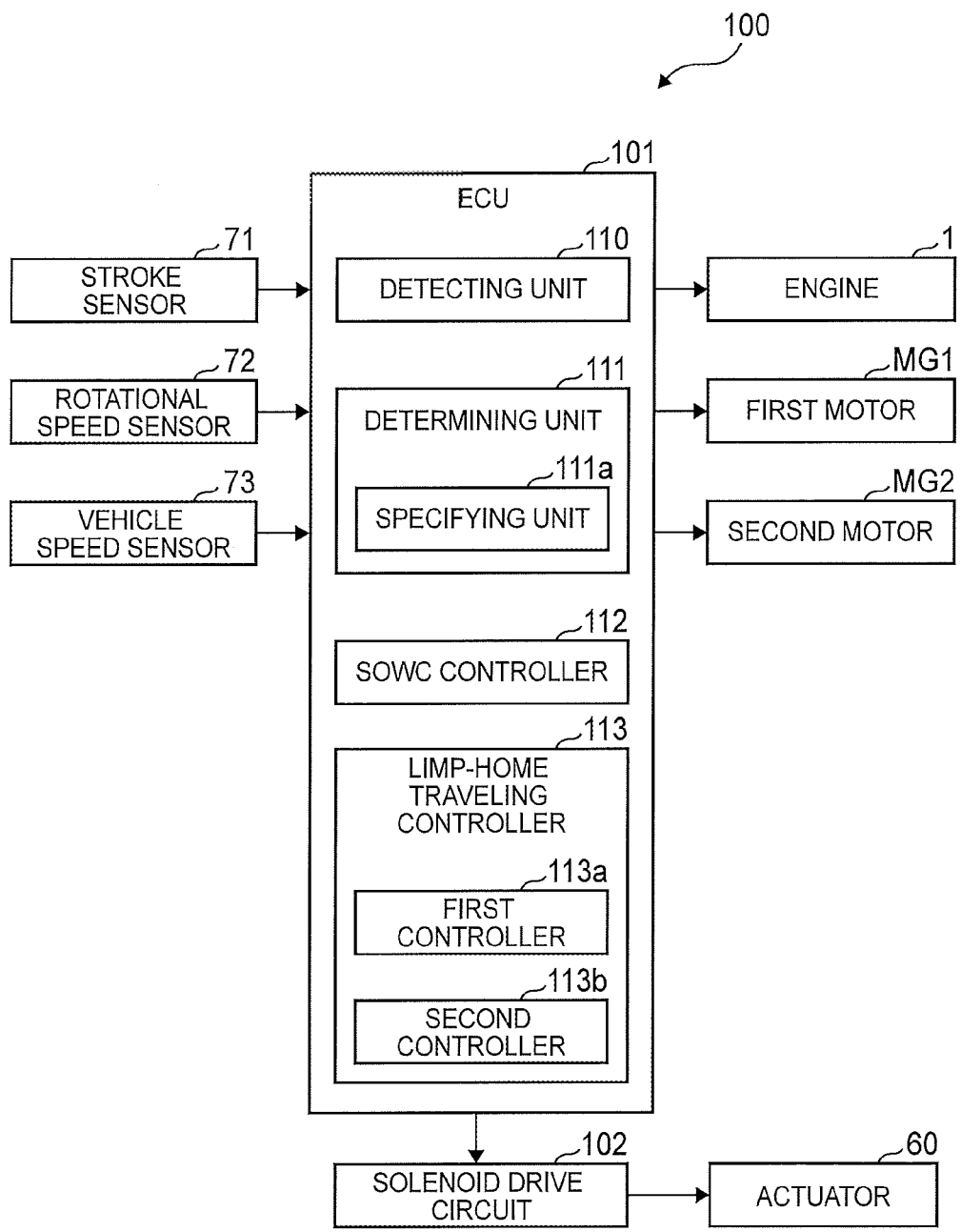
FIG. 4 is a block diagram useful for explaining the configuration of a drive control system for the vehicle according to one embodiment of the disclosure.

Next, the configuration of the drive control system will be described with reference to the functional block diagram of FIG. 4. As shown in FIG. 4, the drive control system 100 includes an electronic control unit (ECU) 101 as a main component, and includes a solenoid drive circuit (which will be simply called "drive circuit") 102 controlled by the electronic control unit 101.

The electronic control unit 101 performs various computations, using signals received from various sensors installed on the vehicle Ve and data stored in a storage device, and outputs command signals based on the results of the computations. As shown in FIG. 4, the electronic control unit 101 receives signals from the stroke sensor 71, rotational speed sensor 72, and a vehicle speed sensor 73. The rotational speed sensor 72 detects the rotational speed (which will be called "SOWC rotational speed") $N_{SO}$ of the SOWC 30. Namely, the rotational speed sensor 72 detects the rotational speed of the notch plate 32 (rotational speed of the second ring gear $R_2$). The vehicle speed sensor 73 detects the vehicle speed. The electronic control unit 101 includes an engine controller (ENG-ECU) that controls fuel injection into the engine 1 and the ignition timing, and an MG controller (MG-ECU) that controls each of the motors MG1, MG2, and outputs command signals to the engine 1 and the motors MG1, MG2, respectively.

When a malfunction of the SOWC 30 is detected during normal traveling of the vehicle Ve, the electronic control unit 101 shifts from a normal traveling mode to a limp-home traveling mode, to cause the vehicle Ve to travel in the limp-home traveling mode. As shown in FIG. 4, the electronic control unit 101 includes a detecting unit 110 that detects conditions of the vehicle Ve, based on signals received from various sensors, determining unit 111 that performs various determining operations, SOWC controller 112 that controls the engaged state and non-engaged state of the SOWC 30, and a limp-home traveling controller 113 that implements the limp-home traveling mode for limp-home traveling of the vehicle Ve. In this description, a traveling condition before a malfunction of the SOWC 30 is detected will be referred to as "normal traveling", and a traveling condition after a malfunction of the SOWC 30 is detected will be referred to as "limp-home traveling".

The detecting unit 110 detects the open state and closed state of the selector plate 33 in the SOWC 30, based on a signal received from the stroke sensor 71. Also, the detecting unit 110 detects the SOWC rotational speed $N_{SO}$ based on a signal received from the rotational speed sensor 72, and detects the vehicle speed based on a signal received from the vehicle speed sensor 73.

The determining unit 111 determines whether a malfunction occurs in the SOWC 30 during traveling. For example, the determining unit 111 determines that a malfunction occurs in the SOWC 30, in the case where a signal indicating the open state of the selector plate 33 (a signal indicating the engaged state of the SOWC 30) is transmitted from the stroke sensor 71 to the electronic control unit 101, when a plate-open command (engaging command) is not generated from the electronic control unit 101 to the SOWC 30. Namely, the determining unit 111 determines whether a malfunction of the SOWC 30 is detected, such as whether the selector plate 33 is unintentionally kept in the open state, during traveling of the vehicle Ve with the SOWC 30 controlled to be placed in the non-engaged state. Also, the determining unit 111 includes a specifying unit 111*a* that specifies a cause of the malfunction of the SOWC 30. The specifying unit 111*a* selects the cause of the malfunction, from a plate-open failure (which will be called "first failure") with which the selector plate 33 is actually kept in the open state, and a failure (which will be called "second failure") of the stroke sensor 71.

The SOWC controller 112 outputs a signal to the drive circuit 102, and performs control for switching the SOWC 30 between the engaged state and the non-engaged state. The drive circuit 102 is electrically connected to the actuator 60, and passes drive current through the actuator 60 according to the signal from the electronic control unit 101. In order to place the SOWC 30 in the engaged state, the electronic control unit 101 outputs a plate-open command to the drive circuit 102, and the drive circuit 102 passes drive current through the actuator 60 according to the signal. As a result, the actuator 60 is driven. On the other hand, in order to place the SOWC 30 in the non-engaged state, the electronic control unit 101 does not output a plate-open command, and therefore, no drive current flows from the drive circuit 102 to the actuator 60.

The limp-home traveling controller 113 implements the limp-home traveling mode when a malfunction of the SOWC 30 is detected during normal traveling. The limp-home traveling mode includes a first limp-home traveling mode and a second limp-home traveling mode. For example, in the event of the first failure with which the selector plate 33 of the SOWC 30 is unintentionally kept in the open state, the first limp-home traveling mode is carried out in which the vehicle travels while rotating the second ring gear $R_2$ in the negative direction. On the other hand, in the event of the second failure (sensor-ON failure), which is an abnormality in sensor values, the SOWC 30 can be placed in the non-engaged state, and therefore, the second limp-home traveling mode is carried out in which the vehicle travels with the SOWC 30 placed in the non-engaged state. As shown in FIG. 4, the limp-home traveling controller 113 includes a first controller 113a that implements the first limp-home traveling mode, and a second controller 113b that implements the second limp-home traveling mode.

Next, the first limp-home traveling mode of the vehicle Ve will be described. The first controller 113a performs rotational speed control on the second ring gear $R_2$ by means of the first motor MG1, and keeps the second ring gear $R_2$ in a negative rotational speed range. Therefore, during traveling in the first limp-home traveling mode, electric power is consumed by the first motor MG1 that performs negative rotational speed control of the SOWC 30. The first limp-home traveling mode includes an EV traveling mode in which the engine 1 is stopped, and the vehicle travels using the second motor MG2 as the power source, and an engine traveling mode in which the vehicle travels using the engine 1 as the power source. During traveling in the EV traveling mode, fuel-cut control (F/C control) of the engine 1 is performed by the electronic control unit 101, so that injection of the fuel into the engine 1 and ignition are stopped. Therefore, during traveling in the EV traveling mode included in the first limp-home traveling mode, electric power is consumed by the second motor MG2 that is being driven as the power source, in addition to electric power consumption at the first motor MG1. On the other hand, in the engine traveling mode included in the first limp-home traveling mode, only the engine 1 functions as the power source; therefore, electric consumption is reduced as compared with the EV traveling mode as described above, and the state of charge (SOC) of the battery is less likely or unlikely to be reduced.

Figure 5A:
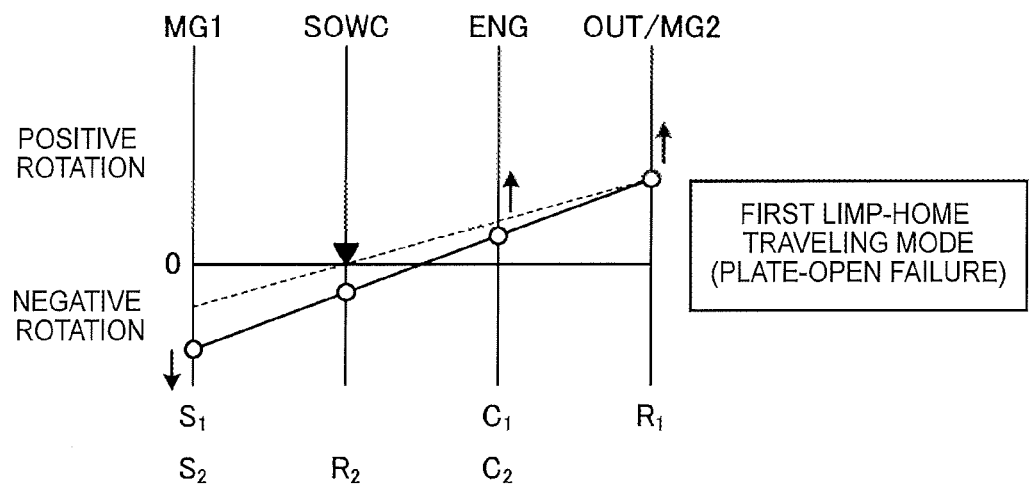
FIG. 5A is a nomographic chart showing operating conditions of the vehicle during traveling in a first limp-home traveling mode.

FIG. 5A is a nomographic chart showing operating conditions during traveling in the first limp-home traveling mode. In FIG. 5A, the case of the engine traveling mode is illustrated. In FIG. 5A, the downward arrow along the MG1 axis represents MG1 torque, and the upward arrow along the ENG axis represents engine torque, while the upward arrow along the OUT/MG2 axis represents drive torque.

As shown in FIG. 5A, in the first limp-home traveling mode, the first motor MG1 rotates in the negative direction so as to keep the second ring gear $R_2$ as the reaction-force element in the negative rotational speed range, and also produces MG1 torque in the negative direction. It is thus possible to reduce or prevent engagement shock at the SOWC 30, which would otherwise occur if the second ring gear $R_2$ attempts to rotate in the positive direction at a rotational speed higher than zero (where the SOWC rotational speed $N_{SO}$ is equal to 0 rpm), as indicated by the broken line in FIG. 5A. Thus, the durability of the SOWC 30 can be improved. Also, in the engine traveling mode, the drive wheels 2 are driven by the engine 1, and no drive torque is required to be generated from the second motor MG2. Although not illustrated in the drawings, the EV traveling mode is carried out in a lower vehicle speed range than the engine traveling mode. More specifically, in the first limp-home traveling mode, it is determined whether the vehicle speed detected by the vehicle speed sensor 73 is equal to or higher than a vehicle speed (threshold value) at which the engine 1 can be started, and the vehicle is switched between the engine traveling mode and the EV traveling mode, based on the result of the determination. Namely, in the first limp-home traveling mode, the engine traveling mode is executed when the vehicle speed (or the engine speed) is equal to or higher than the threshold value, and the EV traveling mode is executed when the vehicle speed (or the engine speed) is lower than the threshold value. The threshold value is a predetermined value.

Next, the second limp-home traveling mode of the vehicle Ve will be described. When the second failure occurs, the second controller 113b causes the vehicle Ve to travel with the SOWC 30 placed in the non-engaged state, irrespective of the signal received from the stroke sensor 71. The second limp-home traveling mode is the HV traveling mode in which the engine 1 is driven and the vehicle travels with engine torque. In this case, the drive wheels 2 are driven using power generated from the engine 1, and the first motor MG1 can generate electric power, using power delivered from the engine 1 and distributed to the first motor MG1 via the first planetary gear mechanism 10. Therefore, in the second limp-home traveling mode, the battery can be charged with electric power generated by the first motor MG1, unlike the first limp-home traveling mode.

Figure 5B:
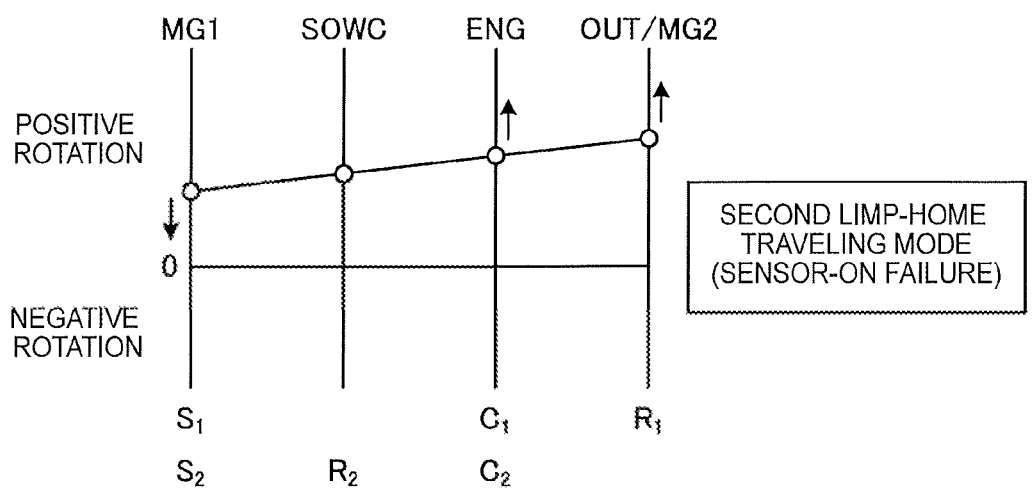
FIG. 5B is a nomographic chart showing operating conditions of the vehicle during traveling in a second limp-home traveling mode.

FIG. 5B is a nomographic chart indicating operating conditions during traveling in the second limp-home traveling mode. In FIG. 5B, the downward arrow along the MG1 axis represents MG1 torque, and the upward arrow along the ENG axis represents engine torque, while the upward arrow along the OUT/MG2 axis represents drive torque. As shown in FIG. 5B, in the second limp-home traveling mode, the SOWC 30 is in the non-engaged state, so that the second ring gear $R_2$ can rotate in a positive rotational speed range. During traveling in the second limp-home traveling mode, the drive wheels 2 are driven using power generated from the engine 1, and the first motor MG1 rotates in the positive direction, and produces MG torque in the negative direction so as to hold engine reaction force, so that the first motor MG1 functions as a generator. Namely, in the second limp-home traveling mode, the SOWC 30 is placed in the non-engaged state during traveling with power of the engine, so that the vehicle Ve can be controlled to travel in a state similar to the continuously variable speed change state (operating conditions as shown in FIG. 2B) during normal traveling. In the second limp-home traveling mode, at least the engine 1 is required to function as a power source. Namely, in the second limp-home traveling mode, the second motor MG2 may not function as a power source, or the second motor MG2 may function as a power source.

Thus, during traveling in the first limp-home traveling mode, the state of charge (SOC) of the battery is likely to be reduced, as compared with the second limp-home traveling mode. On the other hand, during traveling in the second limp-home traveling mode, the battery can be charged with electric power generated by the first motor MG1; therefore, the state of charge (SOC) of the battery is less likely or unlikely to be reduced. Also, if the selector plate 33 is unintentionally placed in the open state, during normal traveling of the vehicle controlled to the continuously variable speed change state, the SOWC 30 may be erroneously engaged, in a condition where the SOWC rotational speed $N_{SO}$ is high in a positive rotational speed range as shown in FIG. 2B. In this case, the notch plate 32, which is rotating in the positive direction, acts like a ratchet to flick the struts 34, and produces abnormal noise, and large engagement shock occurs due to engagement of the struts 34 with the notch plate 32 that is rotating. Therefore, the limp-home traveling mode as described above is carried out, so as to curb occurrence of engagement shock and abnormal noise in the SOWC 30. In addition, an excessive load is less likely or unlikely to be applied to the SOWC 30 due to engagement shock, and therefore, the durability of the SOWC 30 can be improved.

Referring next to FIG. 6, a method of specifying a cause of malfunction will be described with reference to the flowchart of FIG. 6. A control flow illustrated in FIG. 6 is executed by the electronic control unit 101 during normal traveling of the vehicle Ve.

The determining unit 111 determines whether no plate-open command is generated from the electronic control unit 101, and the open state (sensor-OPEN) of the selector plate 33 is detected based on the signal from the stroke sensor 71 (step S1). In step S1, it is determined whether a malfunction occurs, more specifically, a signal indicating that the selector plate 33 is in the open state is generated from the stroke sensor 71, during normal traveling of the vehicle Ve with the SOWC 30 controlled to the non-engaged state. More specifically, when a position signal indicating the plate-open state (engaged state) is received from the stroke sensor 71, even though the electronic control unit 101 outputs no plate-open command (command for engagement), it is determined that a malfunction of the SOWC 30 occurs. Thus, occurrence of a malfunction of the SOWC 30 can be detected, by determining whether the input signal (position signal) from the stroke sensor 71 matches the output signal (plate-open command) from the electronic control unit 101. Namely, the determining unit 111 functions as a malfunction determining unit for detecting that the SOWC 30 is not in the intended control state (non-engaged state). If a negative decision (NO) is obtained in step S1 (NO in step S1), the SOWC 30 is controlled to the intended state, and the current cycle of the control routine ends.

If an affirmative decision (YES) is obtained in step S1 (step S1: YES), the SOWC 30 is not controlled to be placed in the intended state; therefore, a provisional malfunction determination is made by the electronic control unit 101, and the limp-home traveling controller 113 shifts the traveling mode from the normal traveling mode to the first limp-home traveling mode (step S2). For example, the electronic control unit 101 sets a control flag (provisional malfunction determination flag) that makes it possible to recognize detection of a malfunction of the SOWC 30, to ON. This control flag is temporarily stored in the storage device of the electronic control unit 101. Also, the electronic control unit 101 carries out the first limp-home traveling mode, so as to perform rotational speed control by the first motor MG1, and control the SOWC 30 (notch plate 32, second ring gear $R_2$) into the negative rotational speed range. During the rotational speed control, the first motor MG1 is in a power running state in which the motor MG1 rotates in the negative direction, and produces MG1 torque in the negative direction. In this case, the SOWC rotational speed $N_{SO}$ is kept in a given negative rotational speed range.

After shifting to the first limp-home traveling mode, the determining unit 111 determines whether the vehicle speed is equal to or higher than an engagement-permitting vehicle speed (step S3). The engagement-permitting vehicle speed is a preset vehicle speed. For example, the engagement-permitting vehicle speed is a vehicle speed at which the SOWC rotational speed $N_{SO}$ becomes equal to zero (0 rpm), and the engine speed is idling speed (the engine speed at which the engine 1 can operate by itself).

If an affirmative decision (YES) is obtained in step S3 (step S3: YES), the SOWC controller 112 performs normal engagement control on the SOWC 30 (step S4). The normal engagement control is control for stopping output of the MG1 torque by the electronic control unit 101. When step S4 is executed, the vehicle Ve is traveling in the first limp-home traveling mode; therefore, if output of the MG1 torque in the negative direction is stopped, the rotational speed of the first motor MG1 changes toward zero in the negative rotational speed range. As a result, the SOWC rotational speed $N_{SO}$ changes toward zero in the negative rotational speed range. Namely, by executing step S4, the electronic control unit 101 controls the first motor MG1, and intentionally changes the rotational speeds into those of a state (the engaged state of the SOWC 30) indicated by the broken line in FIG. 5A as described above. Then, the determining unit 111 determines whether the SOWC rotational speed $N_{SO}$ is kept at 0 rpm, based on a signal received from the vehicle speed sensor 73 (step S5). When step S5 is executed, the first motor MG1 is controlled by the electronic control unit 101 during traveling in the first limp-home traveling mode, into a state (which will be called "first state") in which the first motor MG1 does not produce MG1 torque. Then, the specifying unit 111*a* determines whether the SOWC rotational speed $N_{SO}$ (rotational speed of the reaction-force element) is kept at 0 rpm until a given length of time elapses in the first state. The given length of time is a predetermined length of time. In the above step S4, the electronic control unit 101 does not output an engagement command (plate-open command) to the drive circuit 102.

If an affirmative decision (YES) is obtained in step S5 (step S5: YES), it can be confirmed that the SOWC 30 is stopped, and therefore, the first failure (plate-open failure) is determined, namely, it is determined that the selector plate 33 is actually open (step S6). In step S6, the electronic control unit 101 sets a control flag (first failure flag) indicating that the cause of malfunction is the first failure, to ON, and the control flag is stored in the storage device. For example, the provisional malfunction determination flag is switched from ON to OFF, and the first failure flag is set to ON. In this case, the first controller 113*a* continues the first limp-home traveling mode (step S7).

If a negative decision (NO) is obtained in step S5 (step S5: NO), it is confirmed that the SOWC rotational speed $N_{SO}$ is higher than 0 rpm (in a positive rotational speed range), and the SOWC 30 is actually in the non-engaged state, which is different from the sensor value; therefore, the second failure (sensor-ON failure) is determined (step S8). The sensor-ON failure is detected when the stroke sensor 71 outputs a signal (signal indicating the engaged state of the SOWC 30) indicating that the selector plate 33 is in the open state, irrespective of the actual position of the plunger 62. In step S8, the electronic control unit 101 sets a control flag (second failure flag) indicating that the cause of malfunction is the second failure, to ON, and the control flag is stored in the storage device. For example, the provisional malfunction determination flag is switched from ON to OFF, and the second failure flag is set to ON. Then, in the case of the second failure, the limp-home traveling controller 113 shifts the traveling mode from the first limp-home traveling mode to the second limp-home traveling mode (step S9).

If the vehicle speed is lower than the engagement-permitting vehicle speed, and a negative decision (NO) is obtained in step S3 (step S3: NO), the determining unit 111 determines whether the vehicle speed is 0 km/h (step S10). In step S10, it is determined whether the vehicle Ve has stopped for the first time, after the vehicle starts traveling in the first limp-home traveling mode. If a negative decision (NO) is obtained in step S10 (step S10: NO), the current cycle of the control routine ends.

If an affirmative decision (YES) is obtained in step S10 (step S10: YES), the limp-home traveling controller 113 causes the first motor MG1 to deliver torque that can rotate the engine 1 (step S11). Since the vehicle Ve is stopped when step S11 is executed, all of the engine speed, vehicle speed (rotational speed of the drive wheels 2), and the SOWC rotational speed $N_{SO}$ are zero (0 rpm). In step S11, a command value of MG1 torque that can rotate the engine 1 is generated from the electronic control unit 101 to the first motor MG1. After step S11 is executed, the determining unit 111 determines whether the SOWC rotational speed $N_{SO}$ is kept at 0 rpm (step S12). When step S12 is executed, the vehicle Ve that has traveled in the first limp-home traveling mode is controlled, after being stopped, into a state (which will be called "second state") in which the limp-home traveling controller 113 causes the first motor MG1 to deliver positive torque that can rotate the engine 1. Then, the specifying unit 111a determines whether the engine 1 is slowly rotated (for example, rotated at a rotational speed that is lower than the idling speed) in the second state. Namely, the MG1 torque command value used in step S11 is determined in advance to a value that provides MG1 torque (positive torque) that is larger than friction torque (negative torque) generated in the engine 1 when the engine 1 that is being stopped is rotated. For example, when the SOWC 30 is in the non-engaged state, the positive MG1 torque generated from the first motor MG1 according to step S11 is transmitted (given) as positive torque to the crankshaft of the engine 1, via the first and second planetary gear mechanisms 10, 20. On the other hand, when the SOWC 30 is in the engaged state, the positive MG1 torque is not transmitted as positive torque to the crankshaft. Then, if an affirmative decision (YES) is obtained in step S12 (step S12: YES), step S6 is executed. If a negative decision (NO) is obtained in step S12 (step S12: NO), step S8 is executed. In the above step S11, the electronic control unit 101 does not output a command for engagement (plate-OPEN command) to the drive circuit 102.

Thus, when a malfunction of the SOWC 30 is detected, the cause of the malfunction is specified so that the actually controllable state becomes clear. Therefore, limp-home traveling suitable for the vehicle state, rather than limp-home traveling overly restricted to the safety side, can be carried out. Namely, since possible causes of malfunctions of the SOWC 30 include a vehicle state that permits the second limp-home traveling mode to be carried out, the second limp-home traveling mode can be selected, which makes it possible to control the vehicle Ve for limp-home traveling in the same manner as in the continuously variable speed change state during normal traveling. When the cause of malfunction is the first failure (plate-open), as in step S6, the SOWC 30 cannot be placed in the non-engaged state; therefore, the first limp-home traveling mode is executed, and the vehicle Ve can be safely operated to travel in the limp-home mode until it is stopped. On the other hand, when the cause of malfunction is the second failure (sensor-ON failure) as in step S8, the SOWC 30 can be placed in the non-engaged state; therefore the second limp-home traveling mode is carried out, and the vehicle Ve can be safely operated to travel in the limp-home mode until it is stopped, while curbing reduction of the state of charge (SOC) of the battery. In the second limp-home traveling mode, the vehicle is in a traveling state in which the first motor MG1 can function as a generator. Therefore, the battery can be charged with electric power generated by the first motor MG1, and the state of charge (SOC) of the battery is less likely or unlikely to be reduced during traveling in the second limp-home traveling mode. In this manner, the distance over which the vehicle can travel in the limp-home mode can be significantly extended or increased. Further, the limp-home traveling controller 113 makes a provisional malfunction determination as in step S2 when a malfunction of the SOWC 30 is detected, and specifies the cause of the malfunction of the SOWC 30 during limp-home traveling, after executing the first limp-home traveling mode first. Namely, the vehicle is initially controlled into a state in which it can travel safely, as a fail-safe, at the time of occurrence of a malfunction, and then, the traveling mode can be switched to an appropriate mode during limp-home traveling. In this manner, engagement shock or abnormal noise generated by a ratchet in the SOWC 30 can be mitigated or prevented, and the distance over which the vehicle can travel in the limp-home mode can be extended, while curbing deterioration of the driveability.

Figure 7:
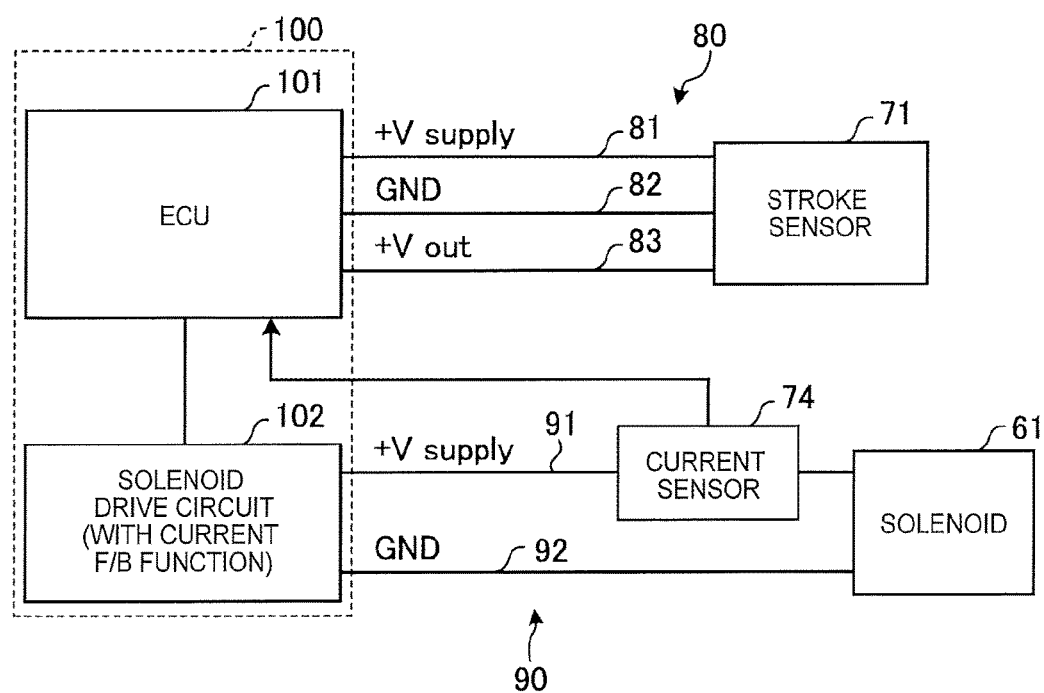
FIG. 7 is a view schematically showing an electric system of the drive control system.
Figure 8:
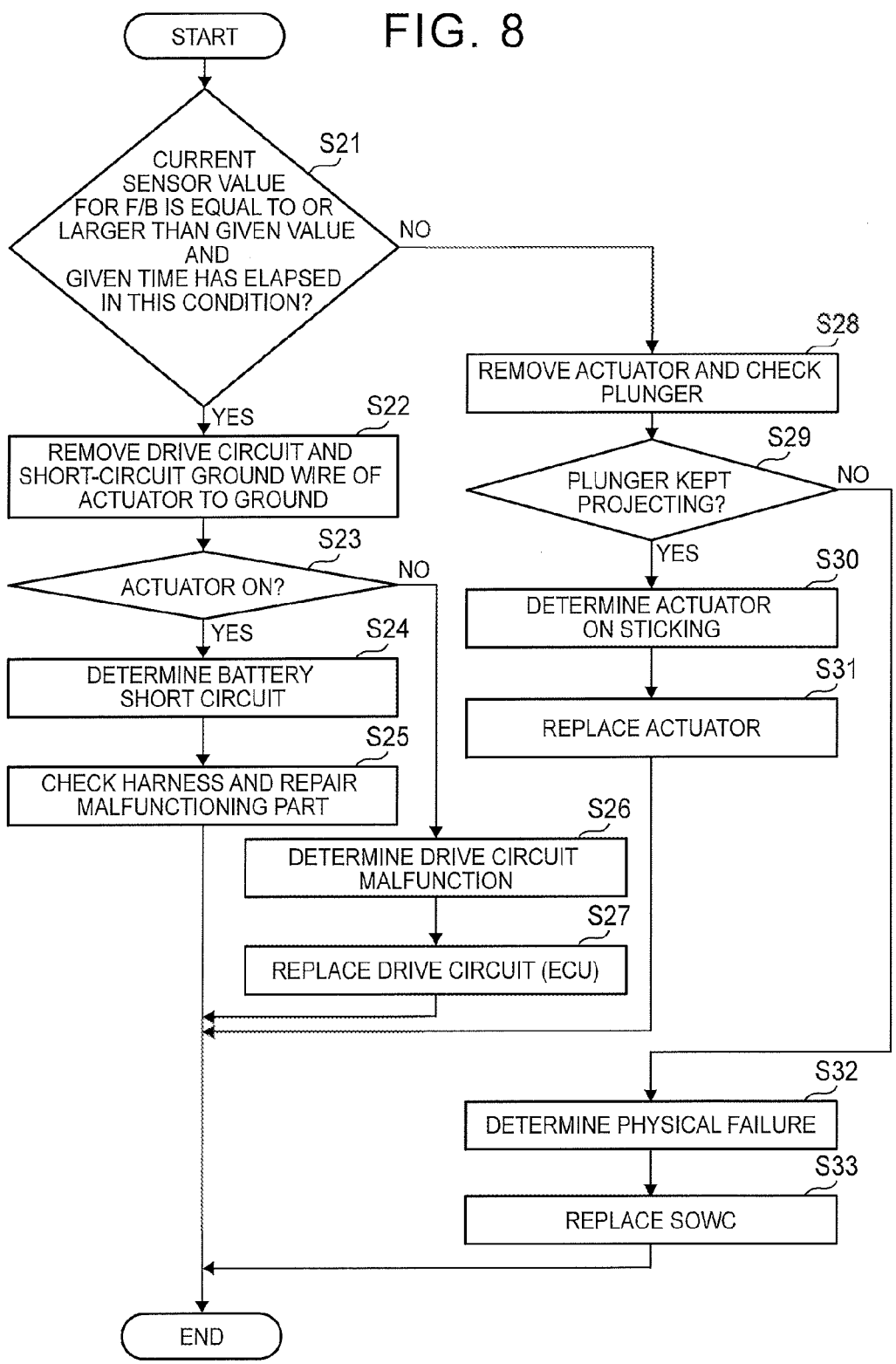
FIG. 8 is a flowchart illustrating a method of specifying an abnormal part by the drive control system for the vehicle.

Referring to FIG. 7 and FIG. 8, a method of specifying a malfunctioning part when a malfunction of the SOWC 30 is detected will be described.

FIG. 7 schematically shows an electric system of the drive control system 100. As shown in FIG. 7, the electronic control unit 101 and the stroke sensor 71 are electrically connected by a wire harness 80. The wire harness 80 includes a positive wire (+V supply) 81, ground wire (GND) 82, and a negative wire (+V out) 83. In operation, electric power is supplied from the electronic control unit 101 to the stroke sensor 71 via the positive wire 81, and a detection signal (position signal) is transmitted from the stroke sensor 71 to the electronic control unit 101 via the negative wire 83. Also, the drive circuit 102 and the solenoid 61 are electrically connected by a wire harness 90. The wire harness 90 includes a positive wire (+V supply) 91 and a ground wire (GND) 92. In operation, drive current (actuator current) flows from the drive circuit 102 to the solenoid 61 via the positive wire 91. Further, the drive control system 100 is configured such that a drive current value (actuator current value) of the solenoid 61 is fed back by a current sensor 74. The electronic control unit 101 receives a signal (current sensor value) from the current sensor 74. The current sensor 74 detects a current value of drive current that flows through the positive wire 91. A battery (not shown) is electrically connected to the solenoid 61 via the drive circuit 102.

FIG. 8 is a flowchart illustrating the method of specifying the malfunctioning part. The flowchart shown in FIG. 8 includes a process of specifying a malfunctioning part by a worker, serviceman, or the like, in a condition where the vehicle Ve is stopped. For example, the flowchart shown in FIG. 8 is executed when the vehicle Ve is repaired. With this specifying method (process) thus implemented, the cause of malfunction is distinguished between an electric failure and a physical failure.

As shown in FIG. 8, it is determined whether a current sensor value for use in feedback (F/B), which is received from the current sensor 74, is equal to or larger than a given value, and a given length of time has elapsed in this condition (step S21).

For example, in step S21, the worker checks a current sensor value of the current sensor 74, using electronic equipment, or the like, and determines whether drive current of the given value or larger keeps flowing through the solenoid 61. The given value used as a threshold value in step S21 is a predetermined value.

Alternatively, step S21 may be carried out by the determining unit 111. In this case, the vehicle Ve is provided with an informing device (not shown) that informs the worker of the result of determination of FIG. S21 made by the determining unit 111. For example, the informing device includes a display device. Then, the worker may check the result of determination in step S21, based on the informed result.

If an affirmative decision (YES) is obtained in step S21 (step S21: YES), the worker removes the drive circuit 102 from the vehicle Ve, and short-circuits the ground wire 92 connected to the actuator 60 (solenoid 61) to the ground (step S22). It is then checked if the actuator 60 is set to ON, as a result of execution of step S22 (step S23). The statement that "the actuator 60 is set to ON" means that the actuator 60 performs engaging operation, or is brought into an engaged state.

If it is confirmed that the actuator 60 is set to ON (step S23: YES), "battery short circuit" that means that the positive wire 91 connected to the solenoid 61 is short-circuited to a battery wire is determined as the cause of the malfunction (step S24). In this case, the wire harness 90 that connects the solenoid 61 with the drive circuit 102 is the malfunctioning part; therefore, the worker checks the wire harness 90, and repairs a malfunctioning portion of the wire harness 90 (step S25).

If the actuator 60 is not set to ON (step S23: NO), "drive circuit malfunction" that means that a malfunction occurs in the drive circuit 102 is determined as the cause of the malfunction (step S26). In this case, the worker replaces the drive circuit 102 (ECU) specified as the malfunctioning part (step S27). In step S27, only the drive circuit 102 may be replaced, or the drive circuit 102 and the electronic control unit (ECU) 101 may be replaced.

If a negative decision (NO) is obtained in step S21 (step S21: NO), the worker removes the actuator 60 from a transaxle (T/A) of the vehicle Ve, and checks the plunger 62 (step S28). At this time, it is determined by the worker whether the plunger 62 is kept projecting at a position to which it projected when drive current was passed through the solenoid 61 (step S29). Steps S28, S29 may be carried out by the worker, using suitable equipment, or may be carried out through visual inspection by the worker.

If the plunger 62 is kept at the projecting position to which it projected when drive current was passed through the solenoid 61 (step S29: YES), "actuator ON sticking" that means that the actuator 60 is stopped in the ON state is determined as the cause of the malfunction (step S30). In this case, the worker replaces the actuator 60 that is specified as the malfunctioning part (step S31). When the actuator 60 has a structure that permits the solenoid 61 and the plunger 62 to be separated from each other, for example, only the solenoid 61 may be replaced in step S31.

If the plunger 62 is not kept projecting (step S29: NO), a physical failure of the SOWC 30 is determined as the cause of the malfunction (step S32). The physical failure of the SOWC 30 may be selected from a failure due to biting of foreign matters in a clearance, which renders the selector plate 33 incapable of physical moving (failure with which the selector plate 33 cannot return to the non-engaged position even under the spring force of the return spring), a failure (link failure) due to disengagement of the arm 35 from the plunger 62, and so forth. In this case, the worker replaces the SOWC 30 specified as the malfunctioning part (step S33). In step S33, only the SOWC 30 may be replaced, or the transaxle including the SOWC 30 may be replaced. Also, when the solenoid 61 and the plunger 62 can be separated from each other, only the plunger 62, out of the actuator 60, may be replaced, in addition to the SOWC 30. Thus, if an affirmative decision (YES) is obtained in at least one of steps S21, S23, S29 shown in FIG. 8, the failure is determined as an electric failure. When a negative decision (NO) is obtained in step S29, the failure is determined as a physical failure.

As explained above, the drive control system 100 of this embodiment specifies the cause of the malfunction of the SOWC 30, and performs limp-home traveling in a controllable state according to the cause of the malfunction. Thus, limp-home traveling suitable for the vehicle state at the time of detection of the malfunction can be realized. This makes it possible for the first motor MG1 to function as a generator during limp-home traveling. As a result, the state of charge (SOC) of the battery is less likely or unlikely to be reduced, and the distance over which the vehicle can travel in the limp-home mode can be extended to be larger than before.

Next, a first modified example of this embodiment will be described. As the first modified example of the above embodiment, the second planetary gear mechanism 20 may be a single pinion type planetary gear mechanism. In the single pinion type second planetary gear mechanism 20, the second sun gear $S_2$ and the first sun gear $S_1$ are coupled to each other so as to rotate as a unit, and the second carrier $C_2$ provides a reaction-force element coupled to the SOWC 30, while the second ring gear $R_2$ and the first carrier $C_1$ are coupled to each other so as to rotate as a unit.

As a second modified example of this embodiment, the SOWC 30 may be configured to function as a MG1 lock mechanism. In the following description of the second modified example, parts of the configuration similar to those of the above embodiment will not be described, and the same reference numerals are used for identifying corresponding elements or components.

Figure 9:
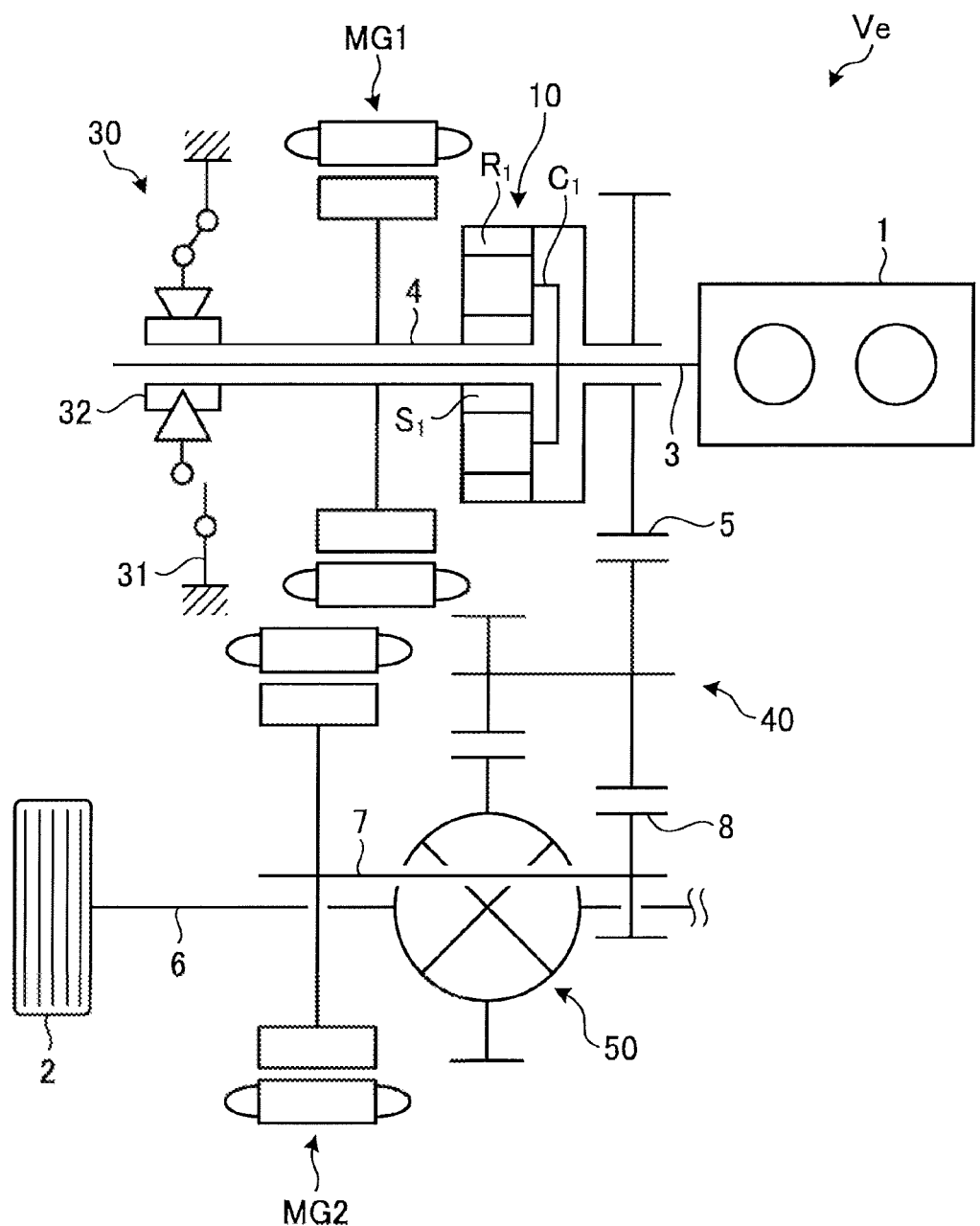
FIG. 9 is a skeleton diagram showing a vehicle in a second modified example of the above embodiment of the disclosure.

FIG. 9 is a skeleton diagram showing a vehicle Ve in the second modified example. As shown in FIG. 9, in the second modified example, the second planetary gear mechanism 20 is not provided, unlike the above embodiment, and the first sun gear $S_1$ of the first planetary gear mechanism 10 provides a reaction-force element that is selectively non-rotatably fixed by the SOWC 30. The notch plate 32 rotates integrally with the first sun gear $S_1$. Therefore, the first rotor shaft 4 of the first motor MG1 that rotates integrally with the first sun gear $S_1$ is selectively fixed by the SOWC 30. In the second modified example, the SOWC rotational speed $N_{SO}$ is equal to the rotational speed of the first sun gear $S_1$ (rotational speed of the first motor MG1).

Figure 10A:
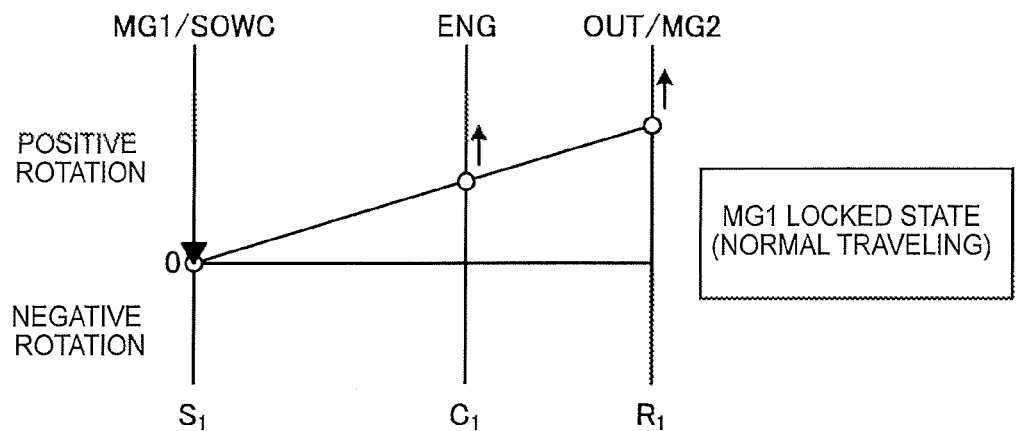
FIG. 10A is a nomographic chart showing an MG1 locked state in the second modified example of the embodiment.

FIG. 10A is a nomographic chart illustrating an MG1 locked state in the second modified example. As shown in FIG. 10A, when the SOWC 30 is engaged during traveling with power of the engine, positive rotation of the first sun gear $S_1$ is inhibited, and negative rotation of the first sun gear $S_1$ is permitted. In the MG1 locked state, the first sun gear $S_1$ is locked by the SOWC 30 such that it cannot be rotated in the positive direction; therefore, an overdrive state is established in which the rotational speed of the first ring gear $R_1$ is higher than the rotational speed of the first carrier $C_1$. Namely, the first planetary gear mechanism 10 functions as a speed increasing machine.

Figure 10B:
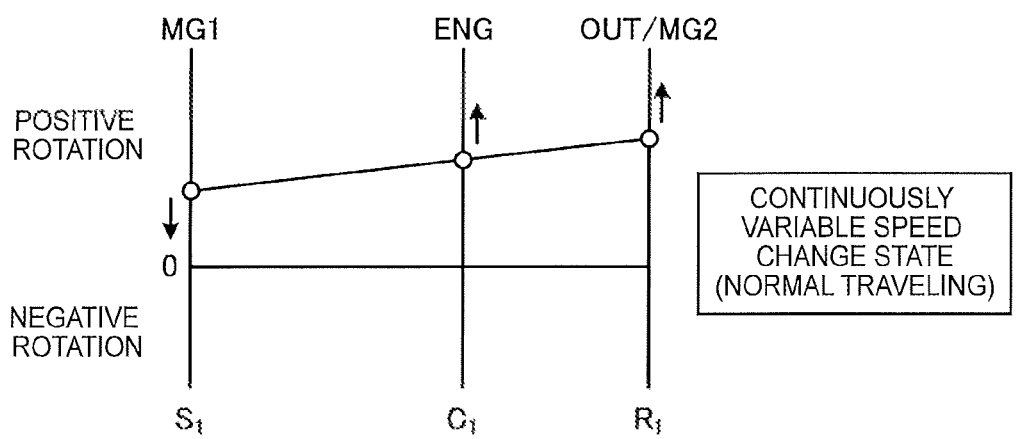
FIG. 10B is a nomographic chart showing a continuously variable speed change state in the second modified example of the embodiment.

FIG. 10B is a nomographic chart indicating a continuously variable speed change state in the second modified example. In FIG. 10B, the downward arrow along the MG1 axis represents MG1 torque, and the upward arrow along the ENG axis represents engine torque, while the upward arrow along the OUT/MG2 axis represents drive torque. As shown in FIG. 10B, when the SOWC 30 is not engaged, positive rotation of the first sun gear $S_1$ is permitted. In the continuously variable speed change state of the second modified example, the first motor MG1 functions as a generator, as in the above embodiment.

Figure 11A:
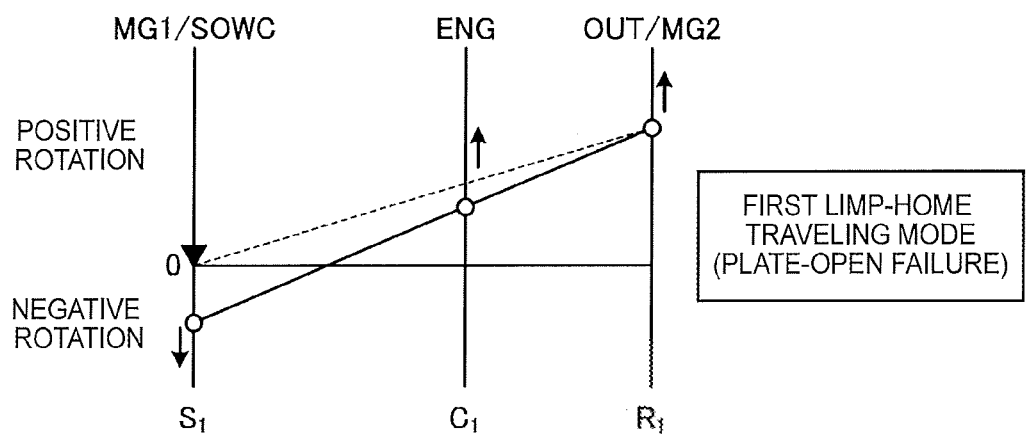
FIG. 11A is a nomographic chart showing operating conditions during traveling in a first limp-home traveling mode in the second modified example of the embodiment.

Next, a first limp-home traveling mode in the second modified example will be described. FIG. 11A is a nomographic chart indicating operating conditions during traveling in the first limp-home traveling mode. In FIG. 11A, the case of the engine traveling mode is illustrated. In FIG. 11A, the downward arrow along the MG1 axis represents MG1 torque, and the upward arrow along the ENG axis represents engine torque, while the upward arrow along the OUT/MG2 axis represents drive torque. As shown in FIG. 11A, in the first limp-home traveling mode in the second modified example, the first motor MG1 is rotated in the negative direction, and produces MG1 torque in the negative direction, so that the first sun gear $S_1$ as the reaction-force element is kept in the negative rotational speed range. It is thus possible to reduce or prevent engagement shock at the SOWC 30, which would otherwise occur if the first sun gear $S_1$ attempts to rotate in the positive direction at a rotational speed higher than zero (where the SOWC rotational speed $N_{SO}$ is equal to 0 rpm), as indicated by the broken line in FIG. 11A. In the second modified example, too, the vehicle can be switched between the engine traveling mode and the EV traveling mode in the first limp-home traveling mode, as in the above embodiment.

Figure 11B:
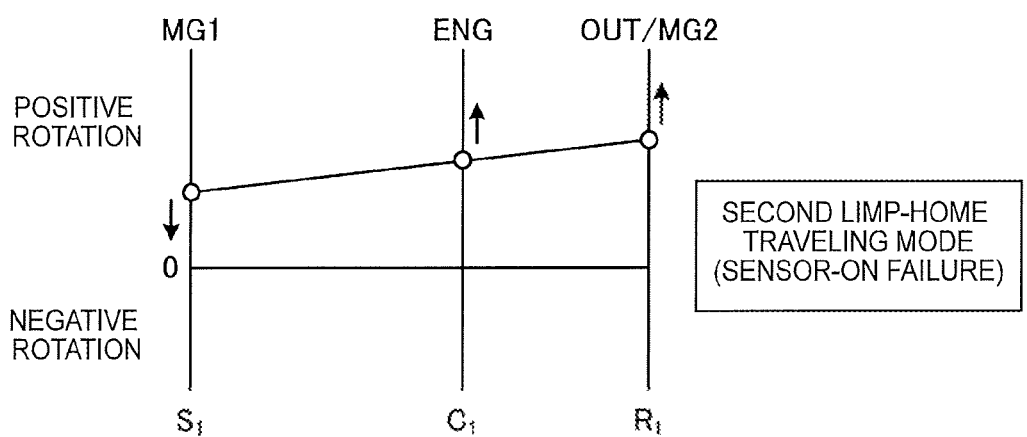
FIG. 11B is a nomographic chart showing operating conditions during traveling in a second limp-home traveling mode in the second modified example of the embodiment.

Next, a second limp-home traveling mode in the second modified example will be described. FIG. 11B is a nomographic chart showing operating conditions during traveling in the second limp-home traveling mode in the second modified example. In FIG. 11B, the downward arrow along the MG1 axis represents MG1 torque, and the upward torque along the ENG axis represents engine torque, while the upward arrow along the OUT/MG2 torque represents drive torque. As shown in FIG. 11B, in the second limp-home traveling mode in the second modified example, the SOWC 30 is in the non-engaged state, so that the first sun gear $S_1$ can rotate in the positive rotational speed range. Namely, in the second modified example, too, the SOWC 30 is placed in the non-engaged state during traveling with power of the engine in the second limp-home traveling mode, so that the vehicle Ve can be controlled to travel in the same manner as in the continuously variable speed change state during normal traveling.

Next, a method of specifying a cause of malfunction in the second modified example will be described. In the case where the SOWC 30 functions as the MG1 lock mechanism, too, the method of specifying a cause of malfunction shown in FIG. 6 above can be applied. In the second modified example, the SOWC rotational speed $N_{SO}$ is equal to the rotational speed of the first sun gear $S_1$ (the rotational speed of the first motor MG1). Therefore, after output of the MG1 torque in the negative direction is stopped in step S4, it is determined in step S5 whether the SOWC rotational speed $N_{SO}$ (the rotational speed of the first motor MG1) is kept at 0 rpm. Also, after execution of step S11, it is determined in step S12 whether the SOWC rotational speed $N_{SO}$ (the rotational speed of the first motor MG1) is kept at 0 rpm. For example, when the SOWC 30 is in the non-engaged state, the MG1 torque of the positive direction delivered from the first motor MG1 according to step S11 is transmitted (given) as torque of the positive direction to the crankshaft of the engine 1, via the first planetary gear mechanism 10.

As described above, the drive control system 100 can be employed in the vehicle Ve including the MG1 lock mechanism as in the second modified example. In this case, too, the second limp-home traveling mode can be implemented, as in the above embodiment; therefore, consumption of electric power can be reduced, and the distance over which the vehicle can travel in the limp-home mode can be extended or increased.

What is claimed is:

1. A drive control system for a vehicle, the drive control system comprising:
an engine;
an electric motor;
a selectable one-way clutch including an annular fixed plate on which engaging pieces are mounted, an annular rotating plate engaged with the engaging pieces, and an annular selector plate provided between the fixed plate and the rotating plate, the selectable one-way clutch being configured to selectively switch between an engaged state and a non-engaged state, the engaged state being a state in which the selector plate is in an open state such that the engaging pieces engage with the rotating plate to restrict a rotational direction of the rotating plate to one direction, the non-engaged state being a state in which the selector plate is in a closed state such that the engaging pieces cannot engage with the rotating plate, and the non-engaged state being a state in which the rotating plate can rotate in both directions;
a planetary gear mechanism including an input element coupled to the engine, an output element that transmits power toward drive wheels, and a reaction-force element, as at least three rotating elements, the reaction-force element being configured to rotate integrally with the rotating plate and to be selectively non-rotatably fixed by the selectable one-way clutch, the planetary gear mechanism being configured to distribute power generated from the engine to the electric motor side and the drive wheels side when the selectable one-way clutch is in the non-engaged state;
an actuator including a movable member coupled to the selector plate, the actuator being configured to switch the selector plate between the open state and the closed state;
a sensor configured to detect a position of the movable member, and output a signal corresponding to the position; and
an electronic control unit configured to:
(i) determine whether a malfunction occurs due to a first failure or a second failure, the malfunction being detection of the open state of the selector plate while the vehicle is traveling with the selectable one-way clutch controlled to be in the non-engaged state, the first failure being a condition where the selector plate is actually placed in the open state, the second failure being a condition where the sensor outputs the signal indicating the open state of the selector plate, even though the selector plate is actually in the closed state;
(ii) execute a first limp-home traveling mode in which the vehicle travels while causing the electric motor to keep a rotational direction of the reaction-force element equal to said one direction, when the malfunction is caused by the first failure; and
(iii) execute a second limp-home traveling mode in which the drive wheels are driven by the engine while the selectable one-way clutch is kept in the non-engaged state, and the electric motor generates electric power, using power distributed to the electric motor side by the planetary gear mechanism, when the malfunction is caused by the second failure.

2. The drive control system according to claim 1, wherein the electronic control unit is configured to:
   (i) control the vehicle to a first state in which no torque is delivered from the electric motor,
   (ii) determine that the malfunction is caused by the first failure, when a rotational speed of the reaction-force element is kept at zero in the first state; and
   (iii) determine that the malfunction is caused by the second failure, when the rotational speed of the reaction-force element is not kept at zero in the first state.

3. The drive control system according to claim 1, wherein the electronic control unit is configured to:
   (i) control the vehicle to be in a second state in which torque that enables the engine to be rotated after the vehicle is stopped is delivered from the electric motor;
   (ii) determine that the malfunction is caused by the first failure, when a rotational speed of the reaction-force element is kept at zero in the second state; and
   (iii) determine that the malfunction is caused by the second failure, when the rotational speed of the reaction-force element is not kept at zero in the second state.

4. The drive control system according to claim 1, wherein the electronic control unit is configured to:
   (i) initially execute the first limp-home traveling mode when the malfunction occurs, and
   (ii) then continue the first limp-home traveling mode when the electronic control unit determines that the malfunction is caused by the first failure, and shift from the first limp-home traveling mode to the second limp-home traveling mode when the electronic control unit determines that the malfunction is caused by the second failure.

5. The drive control system according to claim 1, wherein the planetary gear mechanism includes a first planetary gear mechanism, and a second planetary gear mechanism, the first planetary gear mechanism including a first sun gear coupled to the electric motor, a first carrier coupled to the engine, and a first ring gear coupled to an output member that transmits power toward the drive wheels, the second planetary gear mechanism including a second sun gear that rotates integrally with the first sun gear, a second carrier that rotates integrally with the first carrier, and a second ring gear, the input element being the first carrier, the output element being the first ring gear, and the reaction-force element being the second ring gear.

6. The drive control system according to claim 1, wherein the planetary gear mechanism includes a sun gear coupled to the electric motor, a carrier coupled to the engine, and a ring gear coupled to an output member that transmits power toward the drive wheels, the input element being the carrier, the output element being the ring gear, and the reaction-force element being the sun gear.

* * * * *